United States Patent

[11] 3,619,718

| | | |
|---|---|---|
| [72] | Inventor | Joseph T. Leonard<br>Springfield, Va. |
| [21] | Appl. No. | 12,947 |
| [22] | Filed | Feb. 20, 1970 |
| [45] | Patented | Nov. 9, 1971 |
| [73] | Assignee | The United States of America as represented by the Secretary of the Navy |

[54] METHOD AND APPARATUS FOR NEUTRALIZING ELECTROSTATIC CHARGES ON FLOWING LIQUIDS
12 Claims, 5 Drawing Figs.

[52] U.S. Cl.......................... 317/2 R, 137/1, 302/64, 210/489
[51] Int. Cl.......................... B65g 53/34, B01d 25/04, H05f
[50] Field of Search.......................... 317/2 R; 137/1; 302/64; 210/489

[56] References Cited
UNITED STATES PATENTS
3,016,345  1/1962  Price .......................... 210/315 X

*Primary Examiner*—L. T. Hix
*Attorneys*—R. S. Sciascia, Arthur L. Branning and James G. Murray

ABSTRACT: A method and apparatus whereby electrostatic charges contained in a liquid hydrocarbon are neutralized by utilizing filters which impart opposite charges to the liquid. An organic filter element causes a positive charge and an inorganic filter element causes a negative charge. When properly arranged in series or parallel, the filters allow the electrostatic charges acquired during liquid flow to cancel each other and cause the liquid to become neutralized.

INVENTOR
JOSEPH T. LEONARD
BY
ATTORNEY

METHOD AND APPARATUS FOR NEUTRALIZING ELECTROSTATIC CHARGES ON FLOWING LIQUIDS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method and apparatus for minimizing electrostatic charges acquired by flowing liquids. In particular, this invention is concerned with neutralizing electrostatic charges imparted to liquids that flow through filters.

The accumulation of electrical charges in a moving fluid has long been a problem to the safe handling of flammable liquids. There are numerous instances where static charges have accumulated to levels high enough to cause a discharge of sufficient intensity that ignition of the flammable liquid resulted.

The most prevalent of the electrostatic-induced accidents has been in connection with tank truck and storage vessel loading operations. The spark discharge in such instances occurs between the surface of the charged fluid in the tank or vessel and some component of the tank or vessel system such as reinforcing members, gauge markers, or the loading spout. This type of sparking is internal and can occur whether or not the tank or vessel is grounded to the loading pipe assembly.

A number of methods have been employed to reduce the safety hazards involved in handling flammable hydrocarbon fluids. Among them are: (a) relaxation tanks wherein the charge on the liquid is allowed to dissipate naturally, in the absence of air, before the liquid enters the receiving tank, (b) the use of a static dissipator additive to increase the conductivity of the liquid and thereby promote the rapid dissipation of charge, and (c) the static charge neutralizer, which employs pointed electrodes protruding from a plastic lining of a pipe into the flowing liquid to dissipate the charge by means of a lightning rod effect. Relaxation tanks are impractical where low-conductivity liquids must be moved at high flow rates since the size of the tank required to reduce the charge on the liquid to a safe level becomes prohibitively large. Although the static dissipator additive protects the product during all phases of handling, it does have the disadvantage of interfering with the water separator characteristics in the instances where its being used on a fuel. The static charge neutralizer employs a continuous corona inside the moving liquid to neutralize the charge. A hazardous situation may result if a combustible hydrocarbon/air mixture should accidentally pass through a line containing such a device. Also, there are frequent occasions when such a device does not reduce the charge to a safe level.

In recent years, the quality of hydrocarbon products has improved with an accompanying increased demand for product cleanliness. As a result, filtering arrangements are being used in many liquid-hydrocarbon-handling systems. However, the filter is possibly the greatest single cause of static electricity buildup in such liquid-handling systems. This is mainly due to its large surface area which allows great amounts of charge separation at the filter surface and liquid interface. This mechanism results in the generation of high electrostatic charges. Also, there is a tendency to locate filters close to the loading point. The consequence of this is that when the liquid is discharged into a tank or vessel it is in a highly charged and dangerous condition.

STATEMENT OF THE OBJECTS OF THE INVENTION

An object of the present invention is to minimize the safety hazard caused by static electricity buildup in moving liquids.

An additional object is to prevent the buildup of electrostatic charges to levels high enough to cause an ignition spark in liquid hydrocarbon handling systems.

A further object is to effect a neutralization of accumulated electrostatic charge upon a flowing hydrocarbon liquid.

These and still further objects and advantages of the invention will become apparent from the following description and claims.

SUMMARY OF THE INVENTION

Briefly stated, the method and apparatus of this invention comprises a series of two or more filters which when suitably arranged in conduit means, such as a liquid-hydrocarbon-handling system, will cause a neutralization of electrostatic charges in a liquid flowing therethrough. It has been discovered that filter elements made of organic material which generate a positive charge on a flowing liquid may be used in conjunction with inorganic filter elements, which generate a negative charge, to effect a neutralization of charges on the moving liquid. It follows that if the two filters are arranged in parallel and liquid flow is divided between them, the flow rate through each filter may be regulated in such a manner that the net charge on the liquid arriving at a receiving tank is nearly zero. Additionally, the same effect may be accomplished if the filters are suitably arranged in series.

BRIEF DESCRIPTION OF THE DRAWINGS

The invention will be more clearly understood by referring to the accompanying drawings in which.

DESCRIPTION OF THE PREFERRED EMBODIMENTS

Figure 1:
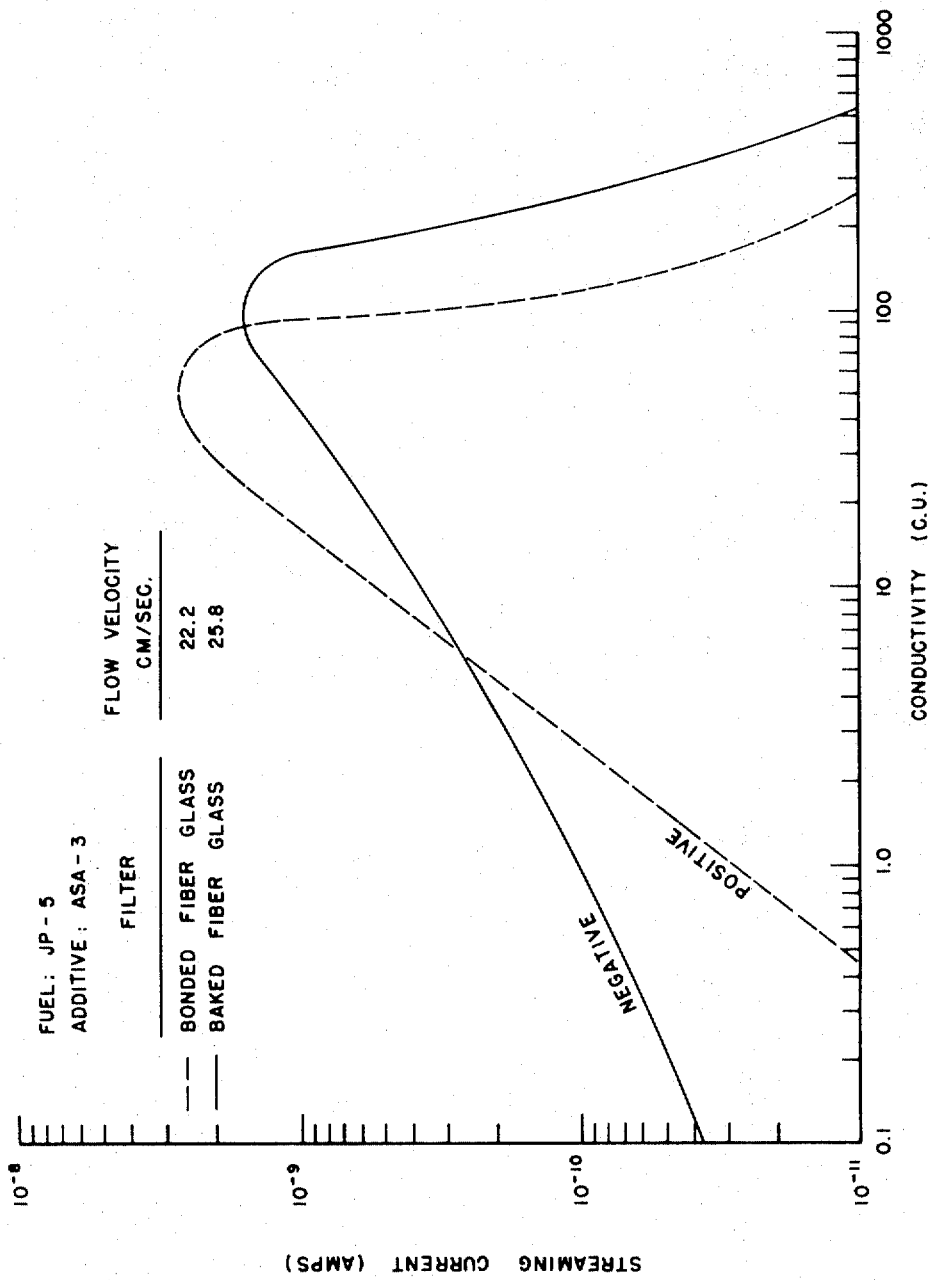
FIG. 1 shows a comparison of streaming current for JP-5 fuel using bonded vs. baked fiberglass filters.

Any type of hydrocarbon liquid that has a tendency to accumulate electrostatic charges while passing through filtering systems is appropriate for use in this invention. Two of the most common jet fuels (JP-4 and JP-5) were utilized in experimental runs. Note the following table I.

TABLE I.—HYDROCARBON LIQUIDS

| Fuel | Type | Aromatic hydrocarbons (av.), percent | Olefins (av.), percent | WSIM [1] | Conductivity C.U.[2] |
|---|---|---|---|---|---|
| JP-4 | Wide cut turbine fuel. | 16.8 | 1.2 | 96 | 2.5 |
| JP-5 | High flash point kerosene (min. f. pt.=140° F.). | 11.6 | 0.8 | 96 | 1.9 |

[1] WSIM=Water Separation Index Modified (Navy minimum allowable is 85).
[2] C.U.=Conductivity unit=$10^{-14}$ mhos/cm.

Also, a static dissipator additive, Shell ASA-3, was used to vary the conductivity of the liquids. This, however, is not necessary to carry out the present invention. Test samples were prepared by adding the appropriate amount of ASA-3 to the liquid and shaking for one-half hour on an Eberbach shaker. The additive-treated liquids were then stored in metal containers for 2 days before any measurements were made. The Shell Charged Ball Method was used to determine the electrical conductivity of all samples. Conductivities are expressed in Conductivity Units, C.U. (1 C.U.=$10^{1\cdot14}$ mhos/cm.). A Keithley Model 610 electrometer was used to measure either the total accumulated charge transferred to a receiving tank of the streaming current (tank current).

For most of the various types of liquids tested, the polarity of the streaming current was positive when passed over an organic filter such as the standard bonded, i.e. phenol-formaldehyde resin coated, fiberglass filter. (Note table II.) The two fuels which exhibited negative streaming currents also has poor water separation properties (WSIM was less than 85), indicating possible contamination of those fuels by surfactants. However, as shown in table II, the streaming current was reversed to a negative polarity by baking the aforementioned bonded filter for one hour at 450°–500° C. to remove the resin coating. Table III shows that this phenomene also occurs over a broad range of conductivity levels.

TABLE II

Effect of Filter Material on Polarity of Streaming Current

| Sample | WSIM | Conductivity, C.U. | Polarity of Streaming Current Bonded Filter | Baked Filter |
|---|---|---|---|---|
| JP-4 | N.D.* | 0.7 | + | − |
| JP-4 | N.D. | 2.7 | + | + |
| JP-4 | 97 | 4.5 | + | − |
| JP-4 | 88 | 6.3 | + | − |
| JP-4 | N.D. | 11.9 | + | − |
| JP-5 | 98 | 0.6 | + | − |
| JP-5 | 100 | 1.2 | + | − |
| JP-5 | 90 | 8.4 | + | + |
| JP-5 | 51 | 10.3 | − | − |
| JP-5 | N.D. | 10.4 | + | − |
| JP-5 | 13 | 17.5 | − | − |
| JP-5 | 95 | 19.4 | + | + |

*Not determined

TABLE III

Effect of Filter on Polarity of Streaming Current for JP-4 Fuel Containing Static Dissipator Additive

| ASA-3, p.p.m. | Conductivity, C.U. | Polarity of Streaming Current Bonded Filter | Baked Filter |
|---|---|---|---|
| 0.01 | 11.2 | + | − |
| 0.02 | 20.7 | + | − |
| 0.03 | 29.1 | + | − |
| 0.05 | 44 | + | − |
| 0.15 | 121 | + | − |
| 0.20 | 193 | + | − |
| 0.25 | 2.4 | + | |
| 0.75 | 333 | + | − |
| 1.00 | 519 | + | − |

Other filter materials such as nylon, Kel-F, dacron, and ordinary glass wool were tested. See table IV. The organic materials were found to produce currents of positive polarity, just as the phenol-formaldehyde resin-coated filter did in table II, whereas the behavior of the glass wool resembled that of the baked fiberglass.

TABLE IV effect of filter material on polarity of Streaming Current
FUEL–JP–5

| ASA-3 p.p.m. | Polarity of Streaming Current | | | |
|---|---|---|---|---|
| | Nylon Filter | Kel-F Filter | Dacron Filter | Glass Wool |
| 0.00 | + | + | + | − |
| X 0.25 | + | + | + | − |
| 0.50 | + | + | | − |
| 0.75 | + | + | + | − |
| 1.00 | + | + | + | − |
| 2.00 | + | N.D.* | + | − |
| 5.00 | + | N.D. | + | − |

*Not determined

Due to the wide variation in porosity and fiber diameters of the organic filter materials, direct comparisons of the charging efficiencies of these filters with the bonded fiberglass filters was not made. However, a comparison of the charging efficiencies of the bonded vs. the baked fiberglass filters are shown in FIG. 1 indicate that while differences in charging efficiency may exist of certain conductivity levels for the two filters materials, the maximum charge outputs of the two filters are quite similar.

Figure 2:
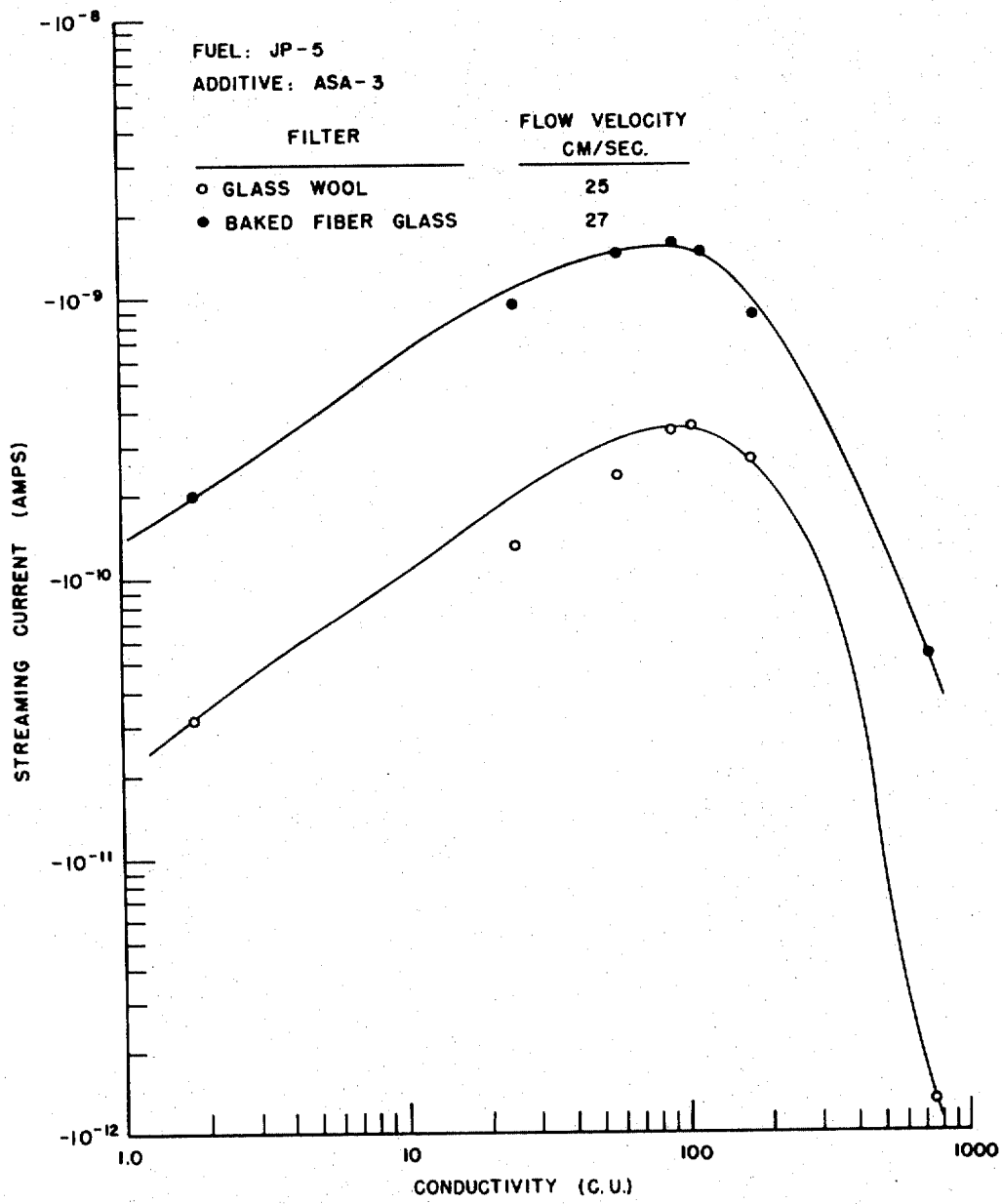
FIG. 2 shows a comparison of streaming current for JP-5 fuel using glass wool vs. baked fiberglass filters.

A comparison of the charging efficiencies of the two filters that produce a negative charge is shown in FIG. 2. The comparison suggests that the baked fiberglass filter may be more efficient, but due to the uncertain arrangement of the fibers in the glass wool filter, it is unlikely that surface areas available to the liquid is the same in both cases. Therefore, it is probable that the observed differences in charging behavior shown in FIG. 2 is an artifact.

The discovery that the sign of the charge on a flowing liquid may be controlled by regulating the nature of the filter surface suggests various techniques and apparatus which may be utilized to reduce the level of charge on a liquid when it arrives at a receiving tank. The following description when read in conjunction with FIG. 3 will more clearly indicate the nature of this invention.

Figure 3:
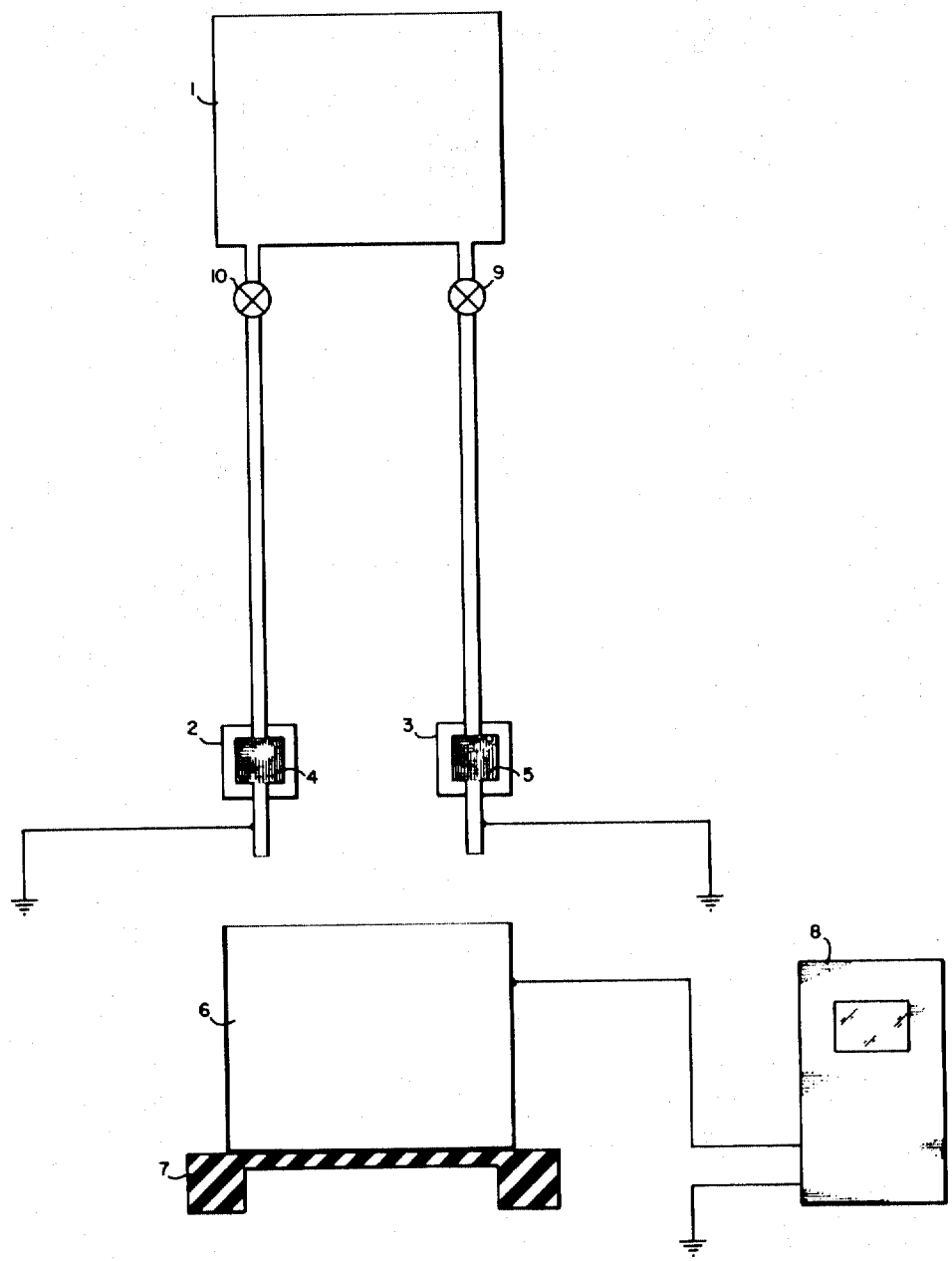
FIG. 3 is a simplified schematic diagram of a liquid-handling apparatus used to demonstrate one of the embodiments of this invention.

FIG. 3 represents a simplified flow system for handling flammable hydrocarbon liquid. Fuel from storage tank 1 passes through either filter cell 2, or filter cell 3, or both simultaneously. Cell 2 contains an ordinary bonded fiberglass filter 4 which causes the liquid to acquire a positive charge. Cell 3 contains a baked fiberglass filter 5 which puts a negative charge on the liquid following therethrough. Upon leaving the filters, the liquid enters a receiving tank 6 which is insulated from the ground by a base 7 of an insulating material. The receiving tank 6 is insulated so that quantities of charge reaching the tank can be accurately measured by an electrometer 8. (It should be noted that in actual practice, the receiving tank or vessel would be grounded to remove any accumulated external charges.) By carefully controlling the flow rate of liquid through each of the filters with valves 9 and 10, the net charge on the liquid reaching the tank 6 may be reduced to nearly zero.

Figure 4:
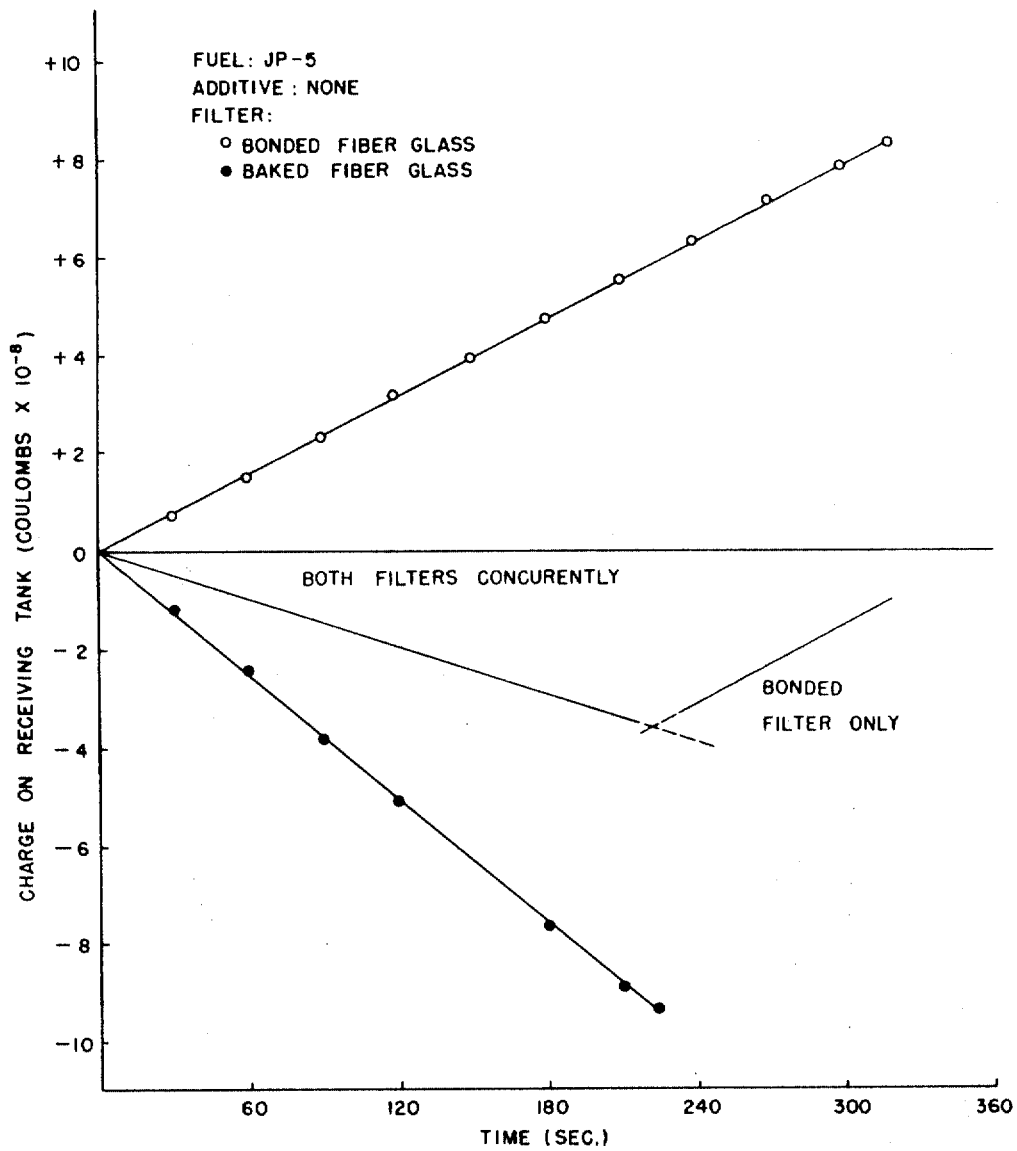
FIG. 4 is a graph showing the charge on the receiving tank vs. time using bonded and baked fiberglass filters.

Results of a typical run in which the liquid was allowed to flow uncontrolled through each filter individually and then through the two filters simultaneously are shown in FIG. 4. Due to the removal of the resin coating, the flow time of the liquid through the baked fiberglass filter was shorter than through the bonded filter. When the liquid passed through the bonded filter, the charge on the receiving tank built up to $+8.3 \times 10b^{18}$ coulombs. With the baked filter, the total charge was $-9.4 \times 10^{18}$ coulombs. However, when the liquid was allowed to flow freely through both filters simultaneously, the charge on the tank increased but at a reduced rate. The sign of the charge was negative indicating that the influence of the baked filter predominated since the flow velocity through this filter was greater. When the flow through the baked filter ceased (after about 210 seconds,) the fuel continued to flow through the bonded filter for another 110 seconds due to the holdup of fuel by the slower filter. The resulting curve (shown in FIG. 4) was parallel to that obtained through the bonded filter alone. At the end of the run, the charge on the receiving vessel was $-1.1 \times 10^{18}$ coulombs, which is the difference in the charge level obtained with each filter individually. When the same run was repeated with the flow through each filter being controlled very carefully, it was found possible to maintain the net charge on the receiving tank at $\pm 1\times 10^{110}$ coulombs, which was less than 1 percent of the total charge through either filter alone. The extension of this discovery to a system in which the relative flow rates through each filter could be controlled by a sensing device located in the receiving tank is readily apparent. Another possibility would be to employ both types of filter elements in a large filter unit, one of which would place a positive charge on the liquid and the other, a negative. By placing the proper distribution of each type of filter in the filter unit, the net charge on the liquid leaving the unit could be greatly reduced.

Figure 5:
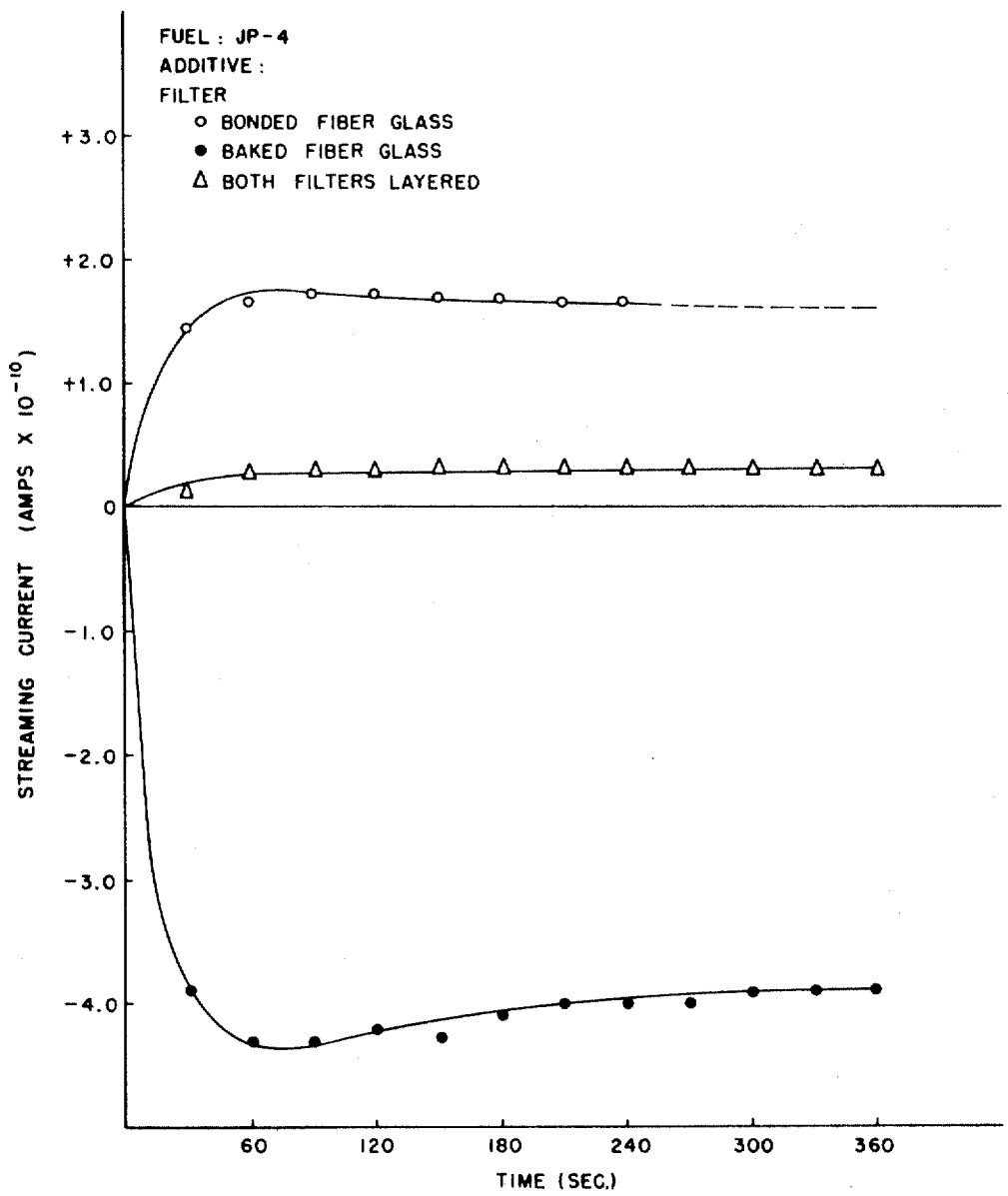
FIG. 5 is a graph showing the effect of layering bonded and baked fiberglass filters on streaming currents.

A third technique would be to combine both filters into a single element by forming alternate multiple layers of the bonded and baked fiber materials. To demonstrate the operation of this method, streaming current vs. time curves were prepared for a bonded and a baked filter (FIG. 5). Then the two filters were placed in the same filtering cell, with the bonded filter on the bottom. A spacer was added to allow for the thickness of the second filter. When the two filters are arranged in this manner, the reduction in the charge is not as great as can be achieved by controlling the flow through each filter individually but the system has potential for smaller liquid handling operations.

The foregoing embodiments have been described for the purpose of illustrating the present invention and are not intended to serve as limitations thereon. Other modifications in the details of construction and operation will be apparent to those skilled in the art, and as such, these fall within the spirit and scope of the present invention.

What is claimed and desired to be secured by Letters Patent of the United States is:

1. A system for reducing the accumulation of electrostatic charges in a liquid, comprising:
    conduit means;
    first filter means located in said conduit means which imparts an electrostatic charge of a polarity to said liquid, and
    second filter means located in said conduit means which imparts an electrostatic charge of opposite polarity to said liquid.

2. The system of claim 1 wherein the first filter means includes a filter element of organic material and the second filter means includes a filter element of inorganic material.

3. The system of claim 2 wherein the second filter means is located in series with said first filter means.

4. The system of claim 2 wherein the second filter means is located in parallel with said first filter means.

5. The system of claim 4 wherein the conduit means includes valve means.

6. A process for reducing the accumulation of electrostatic charges in a liquid comprising:
    flowing at least a portion of said liquid through a first filter means which imparts an electrostatic charge of a polarity to said liquid; and
    flowing at least another portion of said liquid through a second filter means which imparts an electrostatic charge of opposite polarity to said liquid.

7. The process of claim 6 wherein the liquid flows consecutively through each of said filter means.

8. The process of claim 6 wherein portions of the liquid are regulated to flow through each of said filter means to effect a reduction of electrostatic charge.

9. The system of claim 1 wherein said first filter means imparts an electrostatic charge of a positive polarity to said liquid and said second filter means imparts an electrostatic charge of a negative polarity to said liquid.

10. The system of claim 9 wherein said organic material is fiberglass and said inorganic material is glass wool.

11. The system of claim 1 wherein said first filter means includes a filter element of bonded fiberglass and said second filter means includes a filter element of unbonded fiberglass.

12. The process of claim 6 wherein said first filter means imparts a positive electrostatic charge to said flowing liquid and said second filter means imparts a negative electrostatic charge to said flowing liquid.

* * * * *